United States Patent
Matsusue

(10) Patent No.: US 11,469,427 B2
(45) Date of Patent: Oct. 11, 2022

(54) FUEL CELL SYSTEM

(71) Applicant: TOYOTA JIDOSHA KABUSHIKI KAISHA, Toyota (JP)

(72) Inventor: Masaaki Matsusue, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 187 days.

(21) Appl. No.: 16/818,432

(22) Filed: Mar. 13, 2020

(65) Prior Publication Data

US 2020/0321637 A1 Oct. 8, 2020

(30) Foreign Application Priority Data

Apr. 2, 2019 (JP) .............................. JP2019-070860

(51) Int. Cl.
*H01M 8/04089* (2016.01)
*H01M 8/0432* (2016.01)
(Continued)

(52) U.S. Cl.
CPC ... *H01M 8/04097* (2013.01); *H01M 8/04358* (2013.01); *H01M 8/04388* (2013.01);
(Continued)

(58) Field of Classification Search
CPC ......... H01M 8/04097; H01M 8/04358; H01M 8/04388; H01M 8/04402; H01M 8/04582; H01M 8/04231; H01M 8/04589; H01M 8/04753; H01M 8/2457; H01M 8/04104; H01M 8/04201; H01M 8/04761; H01M 8/0662; H01M 8/04514; H01M 8/04723
See application file for complete search history.

(56) References Cited

U.S. PATENT DOCUMENTS

2007/0128488 A1* 6/2007 Aoki ................. H01M 8/04089
429/415
2015/0125767 A1* 5/2015 Wake ................. H01M 8/0491
429/414
(Continued)

FOREIGN PATENT DOCUMENTS

JP 2008-112585 5/2008
JP 2009-043564 A 2/2009
(Continued)

*Primary Examiner* — Ula C Ruddock
*Assistant Examiner* — Matthew W Van Oudenaren
(74) *Attorney, Agent, or Firm* — Finnegan, Henderson, Farabow, Garrett & Dunner, LLP

(57) ABSTRACT

A fuel cell system includes a fuel cell generating electric power by a reaction between a fuel gas and an oxidant gas, an injector supplying the fuel gas to the fuel cell, a discharge line in which an off-gas discharged from the fuel cell flows, an ejector recirculating the off-gas flowing in the discharge line to the fuel cell using a flow of the fuel gas from the injector, a discharge valve discharging the off-gas flowing in the discharge line to the outside, and a control device controlling supply of the fuel gas by the injector and opening and closing of the discharge valve. When supply of the fuel gas by the injector is stopped, the control device opens the discharge valve while the off-gas is recirculated to the fuel cell and closes the discharge valve before supply of the fuel gas by the injector is restarted.

4 Claims, 14 Drawing Sheets

(51) Int. Cl.

| | | |
|---|---|---|
| *H01M 8/04492* | (2016.01) | |
| *H01M 8/0438* | (2016.01) | |
| *H01M 8/04537* | (2016.01) | |
| *H01M 8/04701* | (2016.01) | |
| *H01M 8/04223* | (2016.01) | |
| *H01M 8/04746* | (2016.01) | |
| *H01M 8/2457* | (2016.01) | |
| *H01M 8/0662* | (2016.01) | |
| *H01M 8/04082* | (2016.01) | |

(52) U.S. Cl.
CPC ... *H01M 8/04402* (2013.01); *H01M 8/04492* (2013.01); *H01M 8/04582* (2013.01); *H01M 8/04701* (2013.01); *H01M 8/04104* (2013.01); *H01M 8/04201* (2013.01); *H01M 8/04231* (2013.01); *H01M 8/04514* (2013.01); *H01M 8/04589* (2013.01); *H01M 8/04723* (2013.01); *H01M 8/04753* (2013.01); *H01M 8/04761* (2013.01); *H01M 8/0662* (2013.01); *H01M 8/2457* (2016.02)

(56) References Cited

U.S. PATENT DOCUMENTS

2016/0141659 A1\* 5/2016 Yamamoto ........ H01M 8/04753
                                                  429/414
2017/0250426 A1\* 8/2017 Hamachi ............ H01M 8/1004

FOREIGN PATENT DOCUMENTS

| JP | 2009-252634 | 10/2009 |
|---|---|---|
| JP | 2009-259518 A | 11/2009 |
| JP | 5422979 | 2/2014 |
| JP | 2017-174534 | 9/2017 |

\* cited by examiner

FUEL CELL SYSTEM

INCORPORATION BY REFERENCE

The disclosure of Japanese Patent Application No. 2019-070860 filed on Apr. 2, 2019 including the specification, drawings and abstract is incorporated herein by reference in its entirety.

BACKGROUND

1. Technical Field

The disclosure relates to a fuel cell system.

2. Description of Related Art

In a fuel cell system, an injector injects a fuel gas, and an ejector absorbs an off-gas, which is discharged from a fuel cell to a discharge passage, from the discharge passage by a negative pressure of the fuel gas injected from the injector and recirculates the off-gas to the fuel cell (for example, see Japanese Patent Application Publication No. 2008-112585 (JP 2008-112585 A)). When impurities (such as nitrogen and steam) in the off-gas increase, a discharge valve which is disposed downstream in the discharge passage is opened and thus the impurities are discharged to the outside.

SUMMARY

In the technique disclosed in JP 2008-112585 A, the injector is controlled such that it is fully open, and the discharge valve is open at the same time. At this time, since a pressure loss of the fuel gas in a fuel cell stack is greater than a pressure loss of the off-gas downstream from the discharge valve, some of the fuel gas which is injected from the injector may flow backward from the ejector through the discharge valve and be discharged to the outside.

When the fuel gas flows backward from the ejector and is discharged to the outside in this way, the fuel gas may be wasted and fuel efficiency may deteriorate.

Therefore, the disclosure provides a fuel cell system that can curb waste of a fuel gas.

According to the disclosure, there is provided a fuel cell system including: a fuel cell that generates electric power by a reaction between a fuel gas and an oxidant gas; an injector that supplies the fuel gas to the fuel cell; a discharge line in which an off-gas which is discharged from the fuel cell flows; an ejector that recirculates the off-gas flowing in the discharge line to the fuel cell using a flow of the fuel gas from the injector; a discharge valve that discharges the off-gas flowing in the discharge line to the outside; and a control device that controls supply of the fuel gas by the injector and opening and closing of the discharge valve. When supply of the fuel gas by the injector is stopped, the control device opens the discharge valve while the off-gas is recirculated to the fuel cell and closes the discharge valve before supply of the fuel gas by the injector is restarted.

The fuel cell system may further include a first detection unit configured to detect a temperature of a cooling medium that cools the fuel cell. The control device may delay a time at which the discharge valve is opened further from a time at which supply of the fuel gas by the injector is stopped when the temperature of the cooling medium is lower than a threshold value than when the temperature of the cooling medium is equal to or higher than the threshold value.

In the fuel cell system, the control device may estimate an amount of liquid water in the fuel cell from the temperature of the cooling medium and may further delay the time at which the discharge valve is opened as the amount of liquid water becomes greater.

In the fuel cell system, the control device may calculate a required time for discharging the off-gas based on a partial pressure of impurities in the off-gas and determine a valve opening period of the discharge valve based on the required time.

The fuel cell system may further include: a second detection unit configured to detect an output current of the fuel cell; and a third detection unit configured to detect a pressure of a mixed gas of the fuel gas supplied to the fuel cell and the off-gas recirculated to the fuel cell. The control device may calculate a stoppable period of supply of the fuel gas based on the output current and the pressure of the mixed gas and determine the valve opening period of the discharge valve based on the required time and the stoppable period.

According to the disclosure, it is possible to curb waste of a fuel gas.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of Fuel Cell System 900

Figure 1:
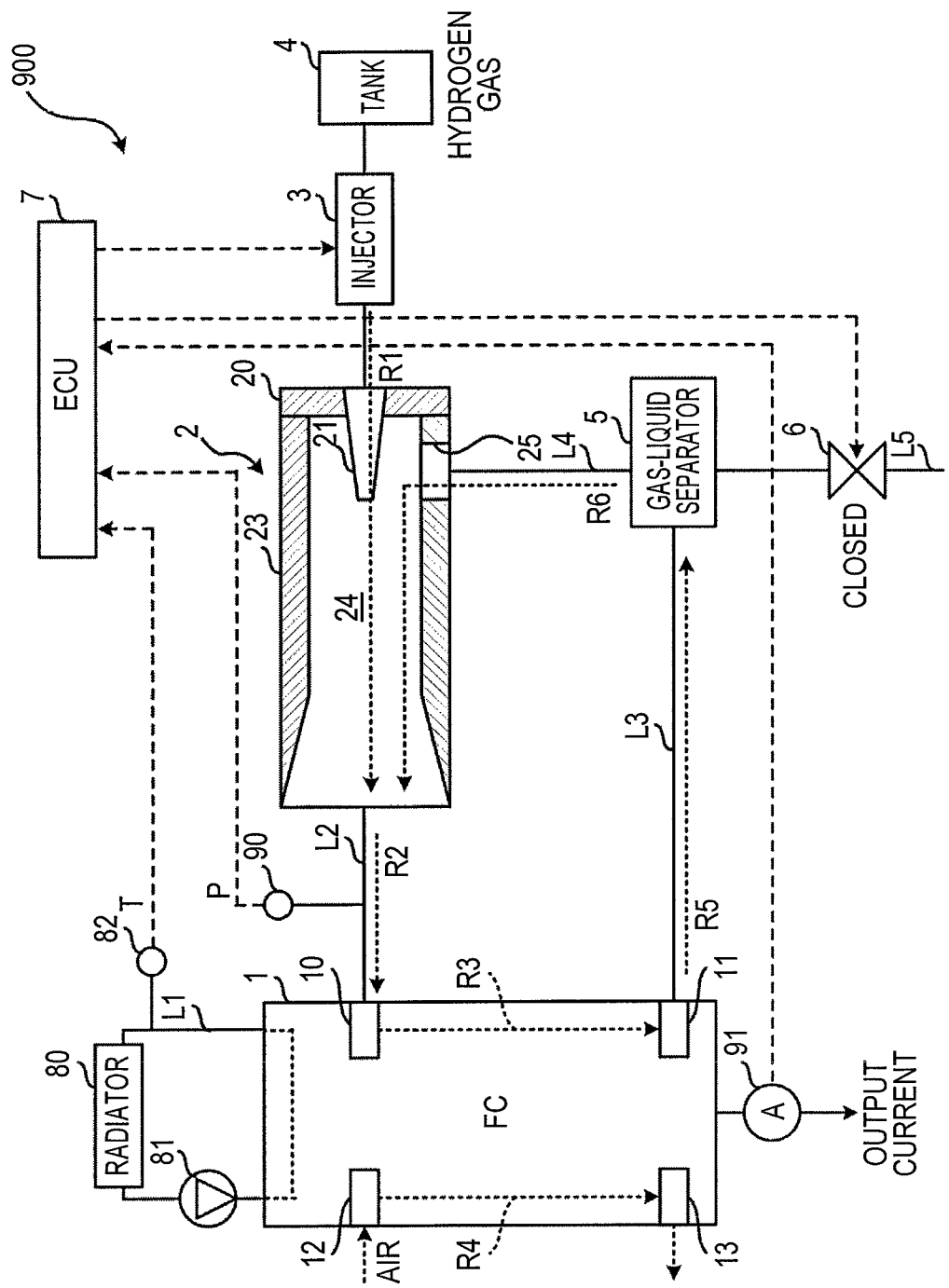
FIG. 1 is a diagram illustrating a configuration of a fuel cell system according to an embodiment.

FIG. 1 is a diagram illustrating a configuration of a fuel cell system 900 according to an embodiment. The fuel cell system 900 includes a fuel cell stack (FC) 1, an ejector 2, an injector 3, a tank 4, a gas-liquid separator 5, a discharge valve 6, an electronic control unit (ECU) 7, a radiator 80, a pump 81, a pressure sensor 90, and a current sensor 91.

The fuel cell stack 1 includes a stacked assembly in which a plurality of solid polymer fuel cells (unit cells) is stacked. The fuel cell stack 1 is supplied with a fuel gas and an oxidant gas and generates electric power by a chemical reaction between the fuel gas and the oxidant gas. An example of the fuel gas is hydrogen gas, and an example of the oxidant gas is air. Electric power and moisture are generated by a chemical reaction between oxygen in the air and the hydrogen gas.

The fuel cell stack 1 includes manifold holes 10 to 13 that penetrate the stacked assembly in a stacking direction thereof. The manifold hole 10 is an inlet of a fuel gas, and the manifold hole 11 is an outlet of the fuel gas. The manifold hole 12 is an inlet of an oxidant gas, and the manifold hole 13 is an outlet of the oxidant gas.

The fuel cell stack 1 is supplied with an oxidant gas via the manifold hole 12 and discharges the oxidant gas which has been used for generation of electric power from the manifold hole 13 (see reference sign R4). The fuel cell stack 1 is supplied with a fuel gas via the manifold hole 10 and discharges the fuel gas (an off-gas) which has been used for generation of electric power from the manifold hole 11 (see reference sign R3). The configuration for supply and discharge of the oxidant gas is not illustrated.

The ejector 2 is connected to the manifold hole 10 on the inlet side via a supply line L2. Accordingly, the fuel cell stack 1 is supplied with a fuel gas from the ejector 2 via the supply line L2. The supply line L2 is a pipe through which the fuel gas passes.

The gas-liquid separator 5 is connected to the manifold hole 11 on the outlet side via a discharge line L3. The fuel cell stack 1 discharges the fuel gas which has been used for generation of electric power as an off-gas from the manifold hole 11 via the discharge line L3. Moisture (liquid water) which is generated by generation of electric power is also discharged to the discharge line L3 along with the off-gas. The off-gas and the moisture flow in the discharge line L3 and are introduced into the gas-liquid separator 5.

As indicated by reference sign R5, the gas-liquid separator 5 separates the off-gas and the moisture (liquid water) flowing from the discharge line L3. The moisture gathers in a water storage tank of a lower part of the gas-liquid separator 5.

The gas-liquid separator 5 is connected to the ejector 2 via a recirculation line L4 and is connected to an output line L5 in which the discharge valve 6 is provided. When the discharge valve 6 is open, moisture gathered in the gas-liquid separator 5 is discharged from the output line L5 to the outside along with the off-gas. When the discharge valve 6 is closed, the off-gas flows into the ejector 2 from the gas-liquid separator 5 via the recirculation line L4 and is recirculated to the fuel cell stack 1 as indicated by reference sign R6. The discharge line L3, the recirculation line L4, and the output line L5 are pipes in which the off-gas flows.

In FIG. 1, a cross-section of the ejector 2 in a direction in which the fuel gas flows is illustrated. The ejector 2 mixes the off-gas from the recirculation line L4 with the fuel gas supplied from the injector 3 and supplies the mixed gas to the fuel cell stack 1.

The ejector 2 includes a nozzle 21 that sprays the fuel gas, a plate-shaped fixing portion 20 that fixes the nozzle 21, and a diffuser 23 that includes a flow passage 24 in which the mixed gas of the off-gas and the fuel gas flows. The fixing portion 20 is provided at one end of the diffuser 23. The other end of the diffuser 23 is connected to the manifold hole 10 on the inlet side via the supply line L2. An opening 25 which is connected to the recirculation line L4 is provided in the diffuser 23.

With this configuration, the ejector 2 recirculates the off-gas flowing in the discharge line L3 to the fuel cell stack 1 using a flow of the fuel gas from the injector 3. The ejector 2 suctions the off-gas from the opening 25 to the flow passage 24 via the recirculation line L4 using the fuel gas which is sprayed from the nozzle 21 as a driving fluid.

The injector 3 sprays the fuel gas stored in the tank 4 and supplies the fuel gas to the fuel cell stack 1. As indicated by a dotted line, the injector 3 supplies the fuel gas in accordance with an electrical control signal which is individually input from the ECU 7. An amount of fuel gas supplied is determined depending on a duty ratio of the control signal.

The fuel gas which is supplied from the injector 3 is sprayed into the flow passage 24 from the nozzles 21 as indicated by reference sign R1. The fuel gas which is sprayed from the nozzle 21 is mixed with the off-gas suctioned from the opening 25 in the diffuser 23, and flows into the manifold hole 10 via the supply line L2 as indicated by reference sign R2. Accordingly, the fuel cell stack 1 can reuse the off-gas for generation of electric power.

The fuel cell stack 1 emits heat with generation of electric power and thus is connected to a cooling line L1 in which a coolant flows. The coolant is an example of a cooling medium that cools the fuel cell stack 1. The radiator 80, the pump 81, and the temperature sensor 82 are provided in the cooling line L1.

The radiator 80 cools the coolant of which the temperature has increased by cooling the fuel cell stack 1. The pump 81 pumps the coolant which has been cooled by the radiator 80 to the fuel cell stack 1. Accordingly, the coolant circulates between the radiator 80 and the fuel cell stack 1. The coolant cools the fuel cell stack 1 by flowing in a flow passage groove between an anode separator and a cathode separator which are bonded to each other.

The temperature sensor 82 is an example of a first detection unit and detects a temperature of the coolant. The temperature sensor 82 detects the temperature of the coolant which is discharged from the fuel cell stack 1 and notifies the ECU 7 of the detected temperature. The ECU 7 performs various types of control based on the temperature of the coolant.

The current sensor 91 is an example of a second detection unit and detects an output current value of the fuel cell stack 1. The current sensor 91 notifies the ECU 7 of the detected output current value. The ECU 7 performs various types of control based on the output current value.

The pressure sensor 90 is an example of a third detection unit and detects a pressure of a mixed gas of the fuel gas supplied to the fuel cell stack 1 and the off-gas recirculated to the fuel cell stack 1. The pressure sensor 90 is provided in the supply line L2 in the vicinity of the manifold hole 10 on the inlet side of the fuel gas, detects the pressure of the mixed gas of the fuel gas and the off-gas in the supply line L2, and notifies the ECU 7 of the detected pressure.

The ECU 7 includes, for example, a central processing unit (CPU) and a memory that stores a program for operating the CPU, and controls the operation of the fuel cell system. The ECU 7 is an example of a control device.

For example, the ECU 7 controls the injector 3 based on the pressure P detected by the pressure sensor 90. For example, the ECU 7 starts supply of the fuel gas by the injector 3 when the pressure P reaches a lower limit value Pmin, and stops supply of the fuel gas by the injector 3 when the pressure P reaches an upper limit value Pmax. Here, the upper limit value Pmax is determined, for example, depending on electric power which is required for the fuel cell stack 1 and the lower limit value Pmin is, for example, a value which is obtained by adding a predetermined margin to the pressure when a cell voltage of one unit cell becomes less than 0 (V) (a so-called hydrogen-deficient state) due to a shortage of the fuel gas in the fuel cell stack 1.

The ECU 7 controls injection of the injector 3 in accordance with a control signal. The injector 3 injects the fuel gas when the control signal indicates "1" and stops injection of the fuel gas when the control signal indicates "0." The pressure P increases during injection of the fuel gas and the pressure P decreases when injection of the fuel gas is stopped. Accordingly, the pressure P repeatedly increases and decreases alternately between the upper limit value Pmax and the lower limit value Pmin under the control of the ECU 7.

The ECU 7 controls opening and closing of the discharge valve 6, for example, in accordance with a control signal in order to discharge liquid water stored in the gas-liquid separator 5 and the off-gas flowing in the discharge line L3 to the outside from the output line L5. The ECU 7 controls opening and closing times of the discharge valve 6 based on the operation state of the fuel cell stack 1.

When the ECU 7 causes the injector 3 to inject the fuel gas while the discharge valve 6 is closed, the fuel gas flows to the fuel cell stack 1 via the routes indicated by reference signs R1 and R2, and the off-gas flows to the fuel cell stack 1 via the routes indicated by reference signs R5, R6, and R2.

Flows of Fuel Gas and Off-Gas when Discharge Valve is Opened During Injection of Fuel Gas However, when the discharge valve 6 is opened during injection of the fuel gas, some of the fuel gas may flow backward from the ejector 2 to the recirculation line L4.

Figure 2:
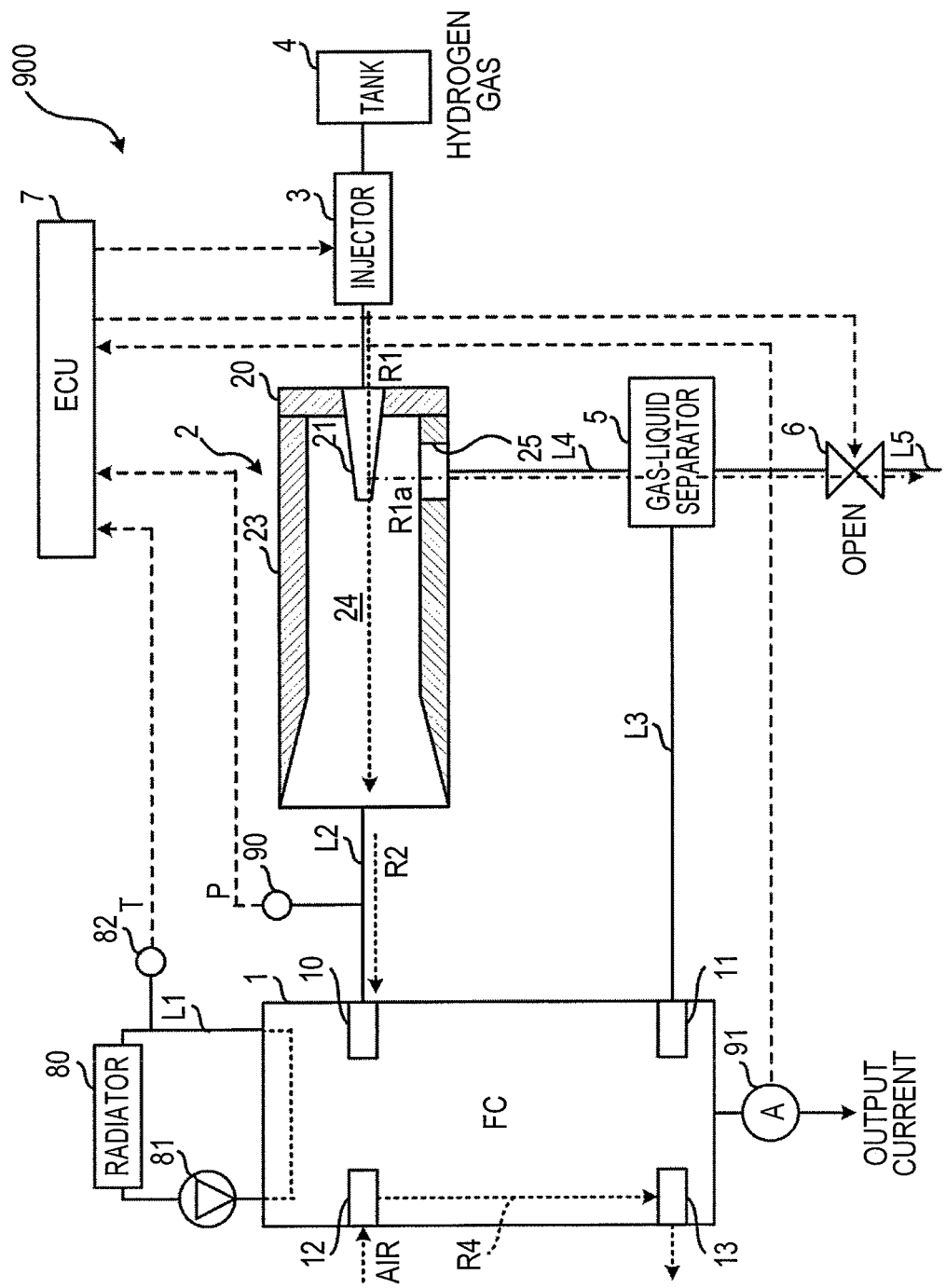
FIG. 2 is a diagram illustrating flows of a fuel gas and an off-gas when a discharge valve is opened while the fuel gas is being injected.

FIG. 2 is a diagram illustrating flows of the fuel gas and the off-gas when the discharge valve is opened during injection of the fuel gas. In FIG. 2, the elements which are common to those in FIG. 1 are referred to by the same reference signs and description thereof will not be repeated.

The ECU 7 opens the discharge valve 6 while the injector 3 is injecting the fuel gas. At this time, since a pressure loss of the fuel gas in the fuel cell stack 1 is greater than a pressure loss of the off-gas downstream from the discharge valve 6, some of the fuel gas injected by the injector 3 flows backward from the ejector 2 to the recirculation line L4 and is discharged from the discharge valve 6 to the outside as indicated by reference sign R1a.

Flows of Fuel Gas and Off-Gas when Discharge Valve is Opened while Injection of Fuel Gas is Stopped When the discharge valve 6 is opened after the flow of the off-gas recirculated to the fuel cell stack 1 (hereinafter referred to as a "recirculation flow") has stopped while injection of the fuel gas is stopped, some of the fuel gas in the fuel cell stack 1 may flow backward from the ejector to the discharge valve via the recirculation line L4.

Figure 3:
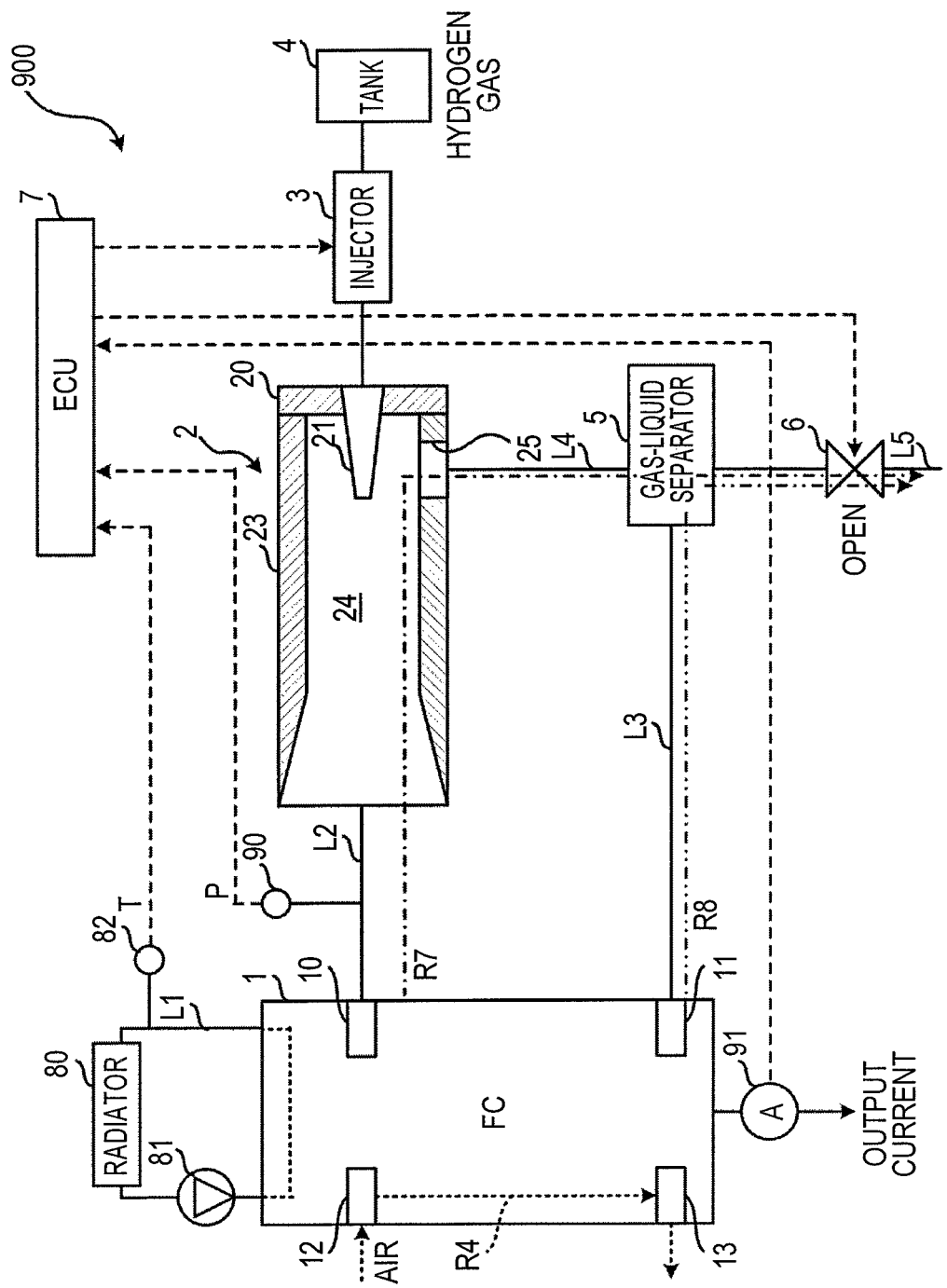
FIG. 3 is a diagram illustrating flows of a fuel gas and an off-gas when a discharge valve is opened while injection of the fuel gas is stopped.

FIG. 3 is a diagram illustrating flows of the fuel gas and the off-gas when the discharge valve is opened while injection of the fuel gas is stopped. In FIG. 3, the elements which are common to those in FIG. 1 are referred to by the same reference signs and description thereof will not be repeated.

The ECU 7 opens the discharge valve 6 after the recirculation flow of the off-gas has stopped while injection of the fuel gas by the injector 3 is stopped. At this time, since the pressure loss of the fuel gas in the fuel cell stack 1 is greater than the pressure loss of the off-gas downstream from the discharge valve 6, some of the fuel gas in the fuel cell stack 1 flows backward from the ejector 2 via the recirculation line L4 and is discharged from the discharge valve 6 to the outside as indicated by reference sign R7. As indicated by reference sign R8, the off-gas in the fuel cell stack 1 flows via the discharge line L3 and is discharged from the discharge valve 6 to the outside.

When the fuel gas flows backward and is discharged to the outside as described above, the fuel gas may be wasted and the fuel efficiency may deteriorate.

Operation of Fuel Cell System According to Embodiment

Therefore, in the embodiment, when supply of the fuel gas by the injector 3 is stopped, the ECU 7 opens the discharge valve 6 while the off-gas is recirculated to the fuel cell stack 1, and closes the discharge valve 6 before supply of the fuel gas is restarted.

Figure 4:
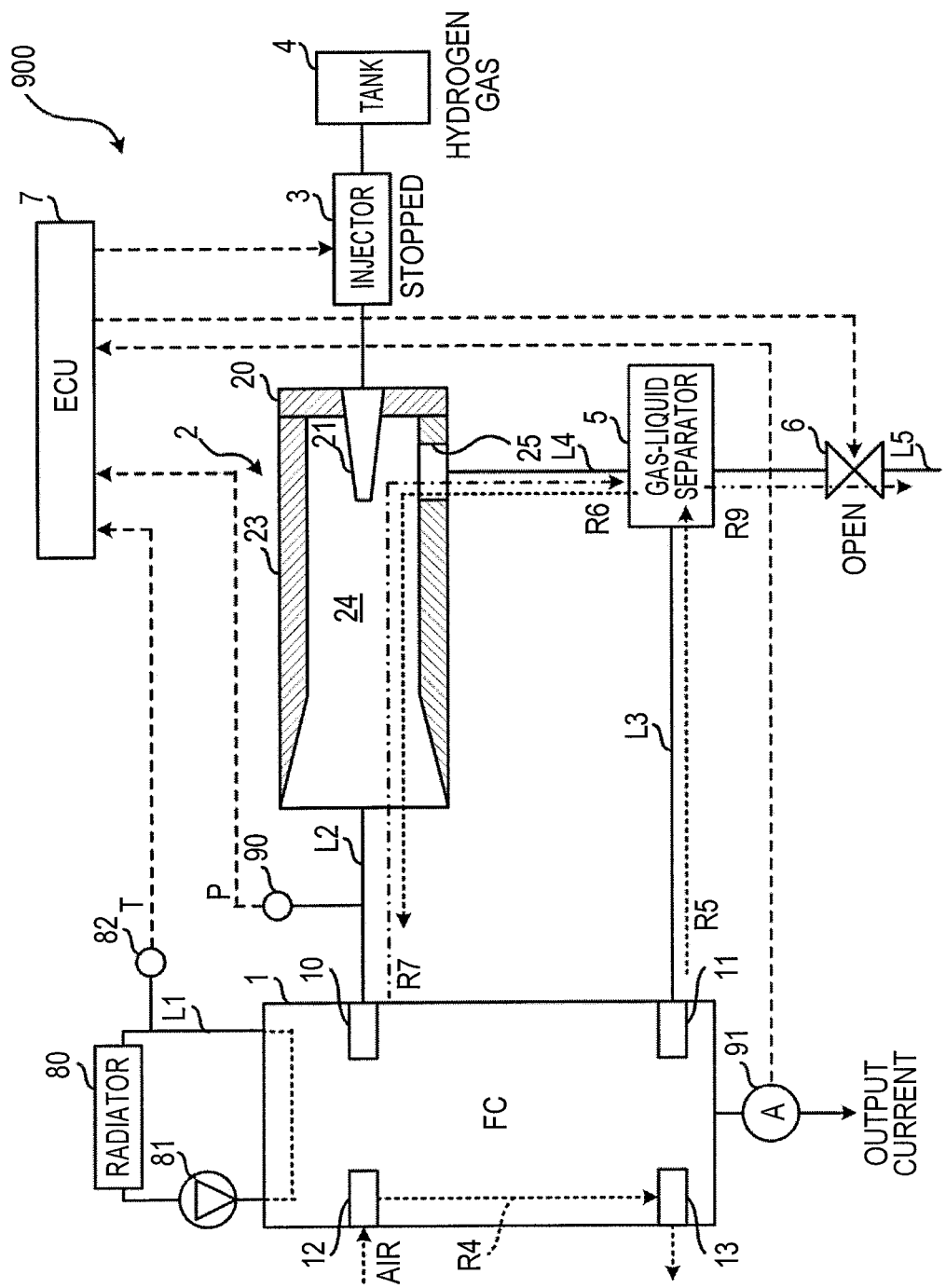
FIG. 4 is a diagram illustrating flows of a fuel gas and an off-gas in the embodiment.

FIG. 4 is a diagram illustrating flows of the fuel gas and the off-gas in the embodiment. In FIG. 4, the elements which are common to those in FIG. 1 are referred to by the same reference signs and description thereof will not be repeated.

The ECU 7 causes the injector 3 to stop injection of the fuel gas before the discharge valve 6 is opened. After injection of the fuel gas has been stopped, the recirculation flow of the off-gas indicated by reference sign R6 is maintained in a period based on an amount of fuel gas injected from the injector 3, an amount of liquid water in the fuel cell stack 1, and design parameters of the ejector 2, the recirculation line L4, and the like.

The ECU 7 opens the discharge valve 6 while there is a recirculation flow of the off-gas. At this time, the fuel gas in the fuel cell stack 1 tends to flow backward from the ejector 2 to the discharge valve 6 as indicated by reference sign R7, but since there is a recirculation flow of the off-gas in the opposite direction of the backward flow, backward flow of the off-gas is curbed by the recirculation flow. Accordingly, waste of the fuel gas is curbed more than in the cases illustrated in FIGS. 2 and 3. The liquid water and the off-gas in the gas-liquid separator 5 are discharged to the outside as indicated by reference sign R9.

The ECU 7 controls opening and closing times of the discharge valve 6, for example, as in first to sixth control examples which will be described below.

First Control Example

Figure 5:
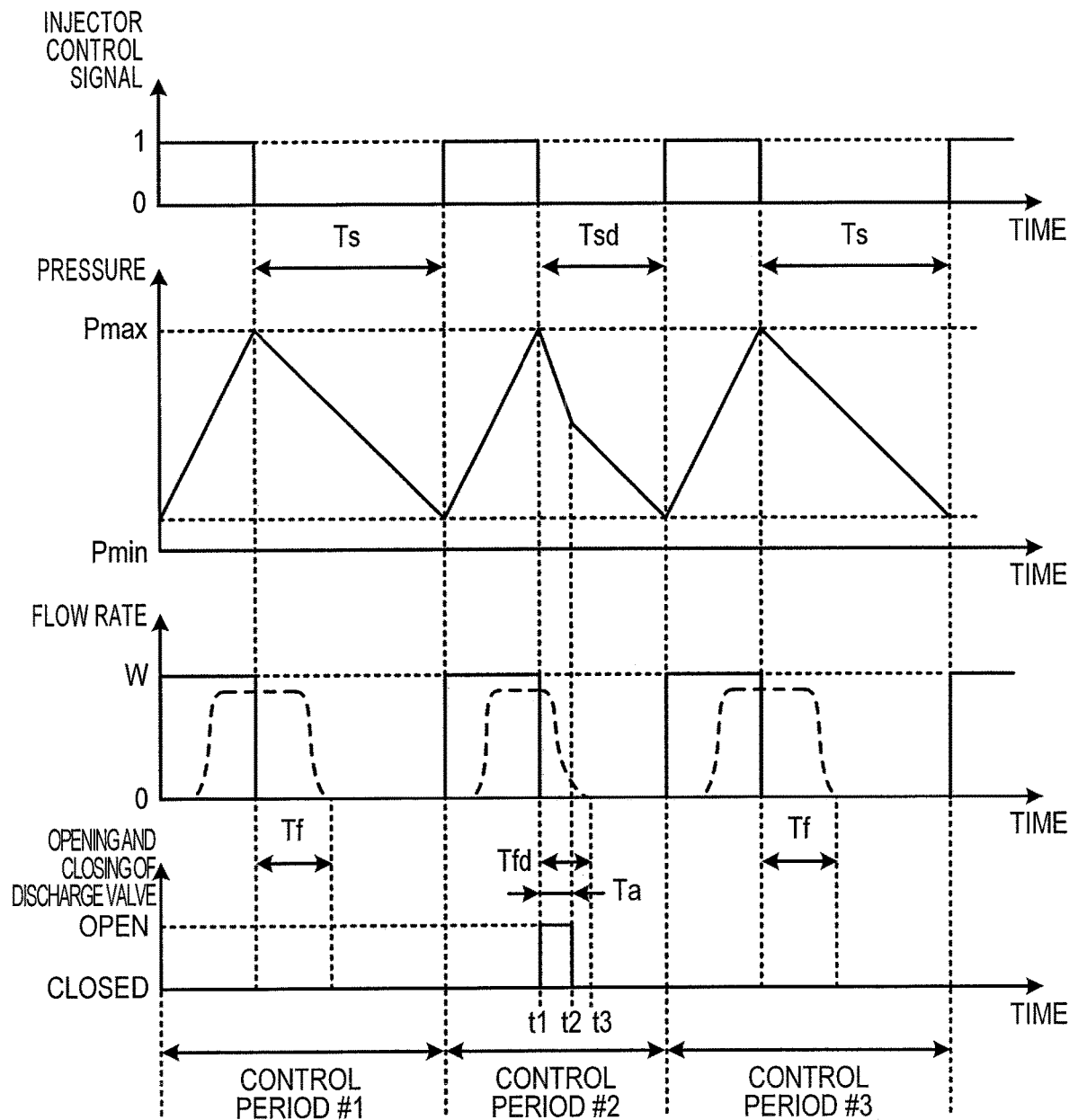
FIG. 5 is a timing chart illustrating a first control example.

FIG. 5 is a timing chart illustrating a first control example. In FIG. 5, the horizontal axis represents time and the vertical axis represents changes of a control signal of the injector 3 (1: injection, 0: stopping of injection), a pressure P on the inlet side of the fuel cell stack 1, flow rates of the fuel gas (a solid line) and the off-gas (a dotted line), and an opening/closing state of the discharge valve 6.

As described above, the ECU 7 acquires the pressure P on the inlet side of the fuel cell stack 1 from the pressure sensor 90 and changes the control signal of the injector 3 from "0" to "1" when the pressure P becomes equal to or less than the lower limit value Pmin. Accordingly, the injector 3 injects the fuel gas and starts supply of the fuel gas. Accordingly, the pressure P starts increasing, and the flow rate of the fuel gas which is supplied to the fuel cell stack 1 increases from 0 to W. The flow rate W is a value based on designs of the injector 3, the ejector 2, the supply line L2, and the like.

When the pressure P reaches the upper limit value Pmax, the ECU 7 changes the control signal of the injector 3 from "1" to "0." Accordingly, the injector 3 stops injection of the fuel gas and stops supply of the fuel gas. Accordingly, the pressure P starts decreasing, and the flow rate of the fuel gas which is supplied to the fuel cell stack 1 decreases from W to 0.

When a flow of the fuel gas is generated, a recirculation of the off-gas is generated by the function of the ejector 2. The flow rate of the recirculation flow increases like a quadratic function after the flow rate of the fuel gas has changed from 0 to W, and becomes almost constant. The flow rate of the recirculation flow is maintained at an almost constant amount by inertia in a time (see Tf, Tfd) based on an amount of fuel gas injected by the injector 3, an amount of liquid water in the fuel cell stack 1, and design parameters of the ejector 2, the recirculation line L4, and the like even after the flow rate of the fuel gas has changed from W to 0, and then decreases like a quadratic function.

In this way, the time at which the recirculation flow of the off-gas stops is delayed from the time at which the flow of the fuel gas stops. Accordingly, as described above, by opening the discharge valve 6 while the recirculation flow is maintained after supply of the fuel gas has stopped, it is possible to curb a backward flow of the fuel gas from the fuel cell stack 1.

In this example, the ECU 7 turns the injector 3 on or off based on the control signal for each of control periods #1 to #3. For example, in control period #2, the ECU 7 detects, for example, an increase in a partial pressure of impurities in the off-gas and determines discharge of the off-gas.

At time t1, the ECU 7 stops supply of the fuel gas by the injector 3 and then opens the discharge valve 6. Here, the time at which the discharge valve 6 is opened is set to be almost the same as the time at which supply of the fuel gas is stopped such that the discharge valve 6 is opened before the recirculation flow stops. Accordingly, the off-gas flowing in the discharge line L3 and the off-gas and the liquid water in the gas-liquid separator 5 are discharged from the discharge valve 6 to the outside. At this time, a backward flow of the fuel gas is curbed by the recirculation flow.

The ECU 7 calculates a required gas discharge time (hereinafter referred to as a "required gas discharge time") of the off-gas, for example, based on the partial pressure of impurities in the off-gas and the pressure P. The ECU 7 determines a valve opening period Ta of the discharge valve 6 based on the required gas discharge time Te.

For example, when the required gas discharge time Te is less than a predetermined value K, the ECU 7 closes the discharge valve 6 at time t2 which is earlier than time t3 at which the recirculation flow stops. In this case, since the discharge valve 6 is maintained closed after the recirculation flow stops, the backward flow of the fuel gas in the fuel cell stack 1 is further curbed.

In control period #2, a time (hereinafter referred to as a "recirculation flow duration time") Tfd in which the recirculation flow is maintained after supply of the fuel gas by the injector 3 has been stopped becomes shorter than a recirculation flow duration time Tf in control periods #1 and #3 for the purpose of depressurization due to opening of the discharge valve 6 (that is, Tfd<Tf). The valve opening period Ta is set in consideration of the recirculation flow duration time Tfd.

In control period #2, a stoppable period Tsd of supply of the fuel gas becomes shorter than a stoppable period Ts in control periods #1 and #3 for the purpose of depressurization due to opening of the discharge valve 6 (that is, Tsd<Ts). Accordingly, in control period #3, the time at which the injector 3 starts supply of the fuel gas is advanced.

Second Control Example

Figure 6:
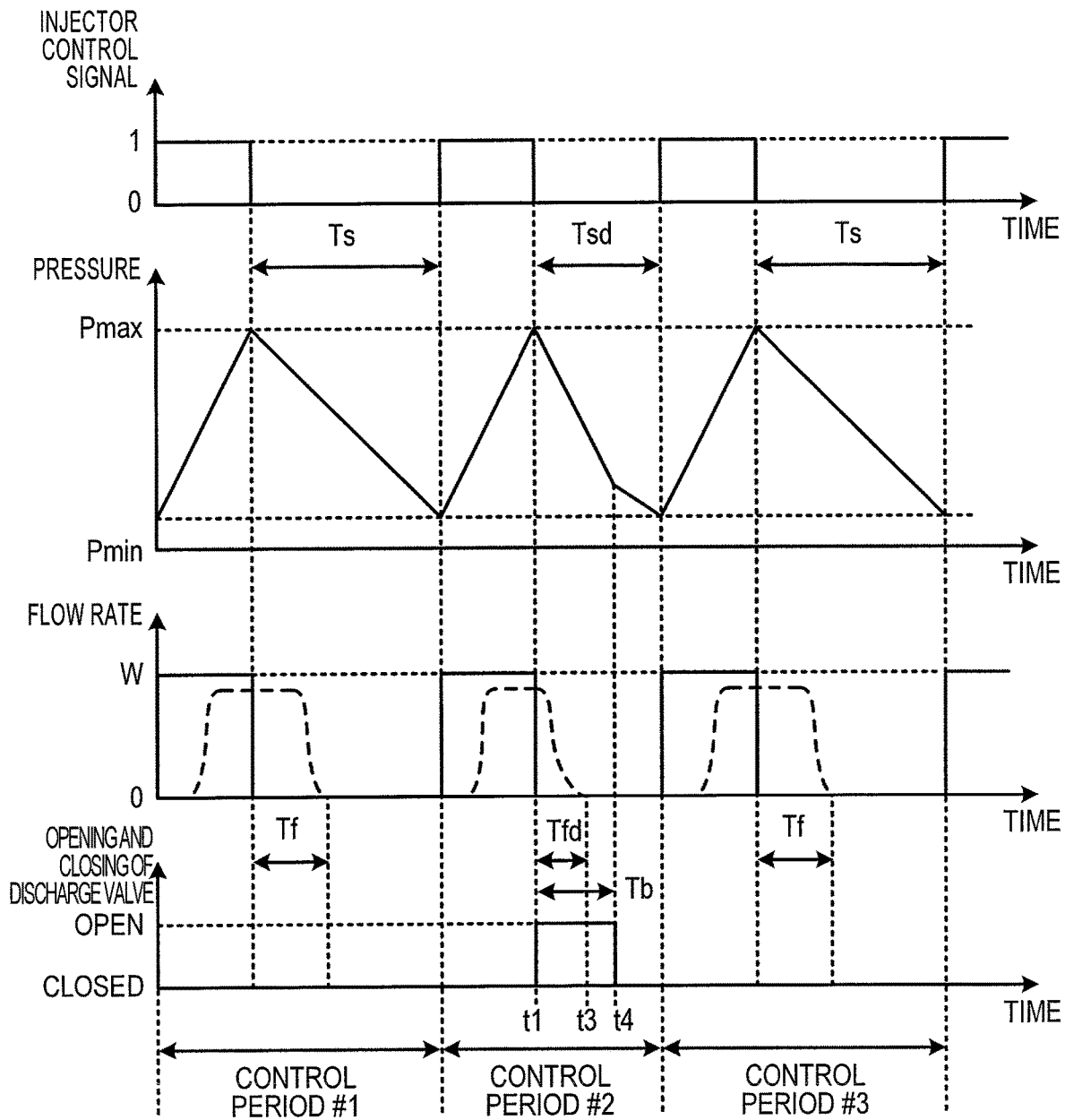
FIG. 6 is a timing chart illustrating a second control example.

FIG. 6 is a timing chart illustrating a second control example. Details in FIG. 6 which are common to FIG. 5 will not be described below.

For example, when the required gas discharge time Te is greater than the predetermined value K, the ECU 7 closes the discharge valve 6 at time t4 which is later than time t3 at which the recirculation flow stops. Here, time t4 is a time between a time point at which the recirculation flow duration time Tfd has elapsed and a time point at which supply of the fuel gas is restarted. The time at which the discharge valve 6 is opened is almost the same as the time at which supply of the fuel gas is stopped similarly to the first control example.

Accordingly, the valve opening period Tb of the discharge valve 6 is longer than the valve opening period Ta in the first control example (that is, Ta<Tb). Accordingly, the off-gas can be discharged from the discharge valve 6 in a period longer than that in the first control example.

In this way, the ECU 7 calculates the required gas discharge time Te of the off-gas based on the partial pressure of impurities in the off-gas and determines the valve opening periods Ta and Tb of the discharge valve 6 based on the required gas discharge time Te. Accordingly, the ECU 7 can open the discharge valve 6 in the appropriate valve opening periods Ta and Tb depending on the state of the fuel cell system.

Third Control Example

Figure 7:
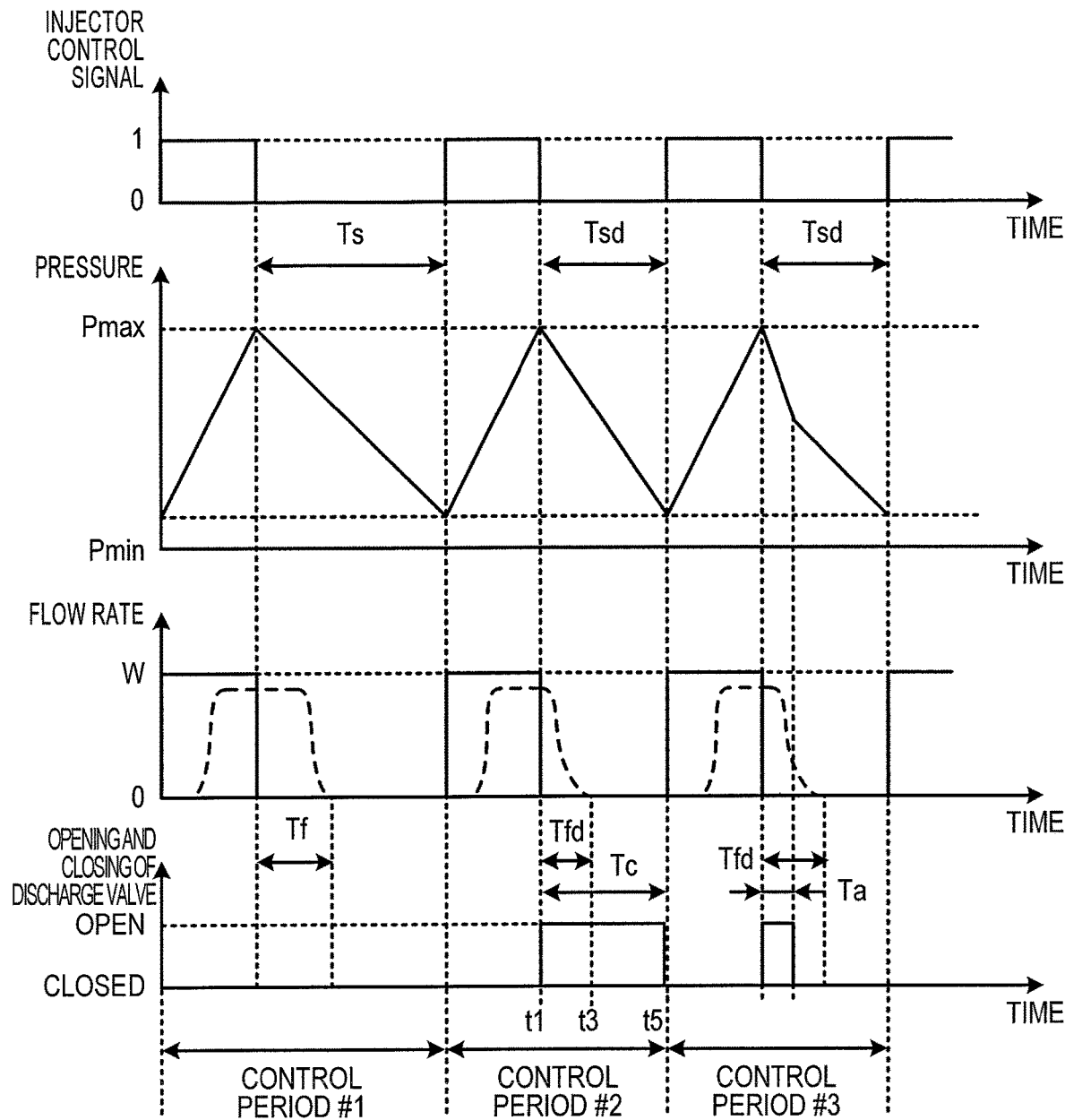
FIG. 7 is a timing chart illustrating a third control example.

FIG. 7 is a timing chart illustrating a third control example. Details in FIG. 7 which are common to FIG. 5 will not be described below.

For example, when the required gas discharge time Te is equal to or greater than the stoppable period Tsd, the ECU 7 closes the discharge valve 6 at time t5 which is later than time t3 at which the recirculation flow stops and later than time t4. Here, time t5 is a time immediately before supply of the fuel gas is restarted after the recirculation flow duration time Tfd has elapsed. The time at which the discharge valve 6 is opened is almost the same as the time at which supply of the fuel gas is stopped similarly to the first control example.

Accordingly, the valve opening period Tc of the discharge valve 6 is longer than the valve opening period Tb in the second control example (that is, Tb<Tc). Accordingly, the off-gas can be discharged from the discharge valve 6 in a period longer than that in the second control example.

In this example, since the required gas discharge time Te is equal to or greater than the stoppable period Tsd, the amount of off-gas discharged is not sufficient by only control period #2, and the discharge valve 6 is also opened and closed in next control period #3. When the remaining time of the required gas discharge time Te is equal to or less than the predetermined value K, the ECU 7 opens the discharge valve 6 in the valve opening period Ta similarly to the first control example.

In this way, the ECU 7 calculates the stoppable period Tsd of supply of the fuel gas and determines the valve opening periods Ta to Tc of the discharge valve 6 based on the required gas discharge time Te and the stoppable period Tsd. Accordingly, the ECU 7 can open the discharge valve 6 in the valve opening periods Ta to Tc which are suitable depending on the state of the fuel cell system 900 in consideration of the time at which supply of the fuel gas is restarted.

In the first and second control examples, the recirculation flow duration time Tfd in control period #2 becomes shorter than the recirculation flow duration time Tf in control periods #1 and #3 for the purpose of depressurization due to opening of the discharge valve 6. At this time, when there is a large amount of liquid water in the gas-liquid separator 5, much time is required for discharge of the liquid water, discharge of the off-gas is delayed, and thus the gas discharge time may be insufficient for the required gas discharge time Te.

Here, the amount of liquid water in the fuel cell stack 1 decreases because the amount of saturated steam increases as the temperature in the fuel cell stack 1 increases. The temperature in the fuel cell stack 1 can be estimated from, for example, the temperature T of the coolant.

Accordingly, as in fourth to sixth control examples which will be described below, the ECU 7 delays the time at which the discharge valve 6 is opened more from the time at which supply of the fuel gas by the injector 3 is stopped when the temperature T of the coolant is lower than a threshold value than when the temperature T of the coolant is equal to or higher than the threshold value.

Fourth Control Example

Figure 8:
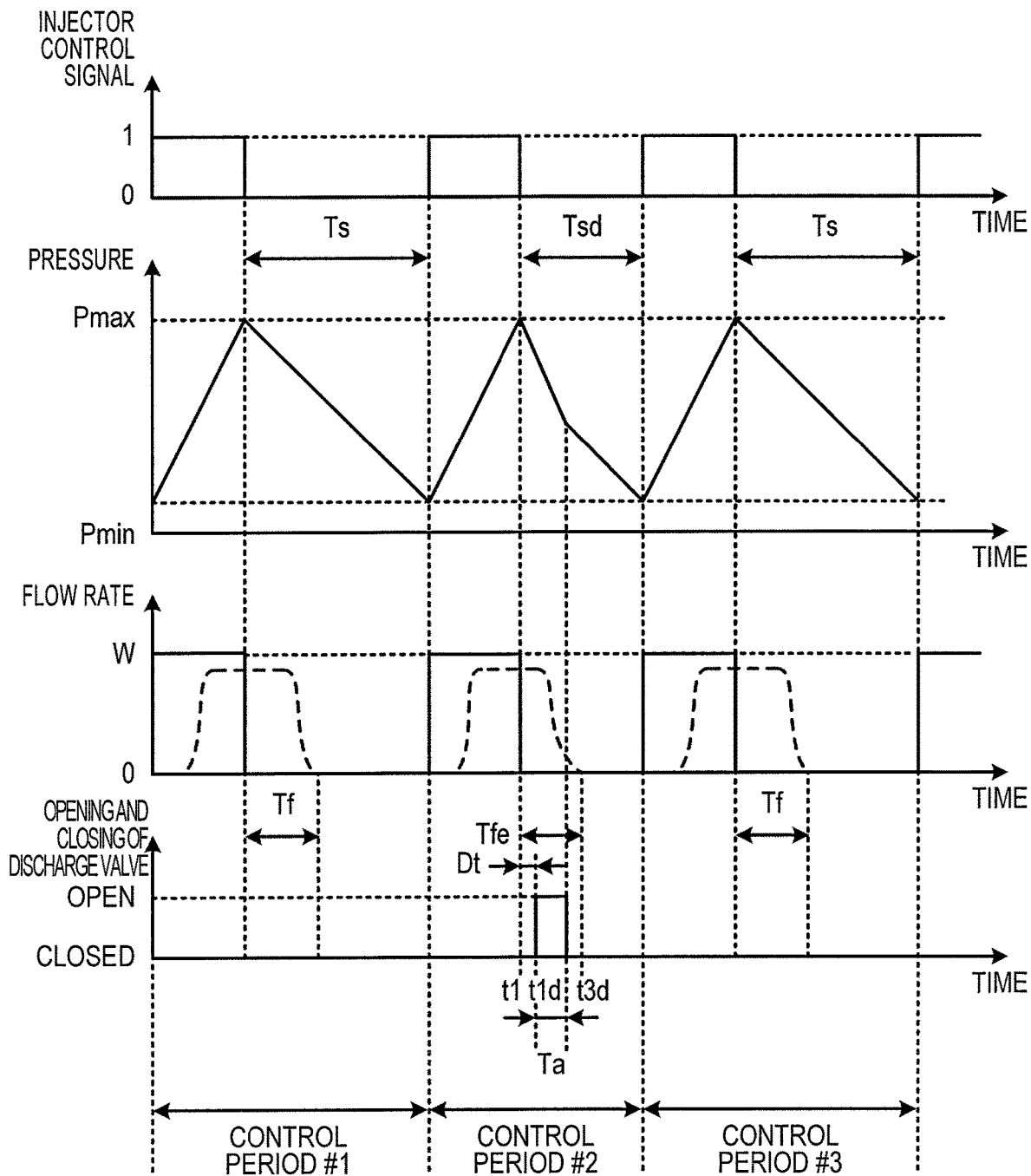
FIG. 8 is a timing chart illustrating a fourth control example.

FIG. 8 is a timing chart illustrating a fourth control example. Details in FIG. 8 which are common to FIG. 5 will not be described below. In this example, the valve opening time of the discharge valve 6 in the first control example is delayed.

The ECU 7 opens the discharge valve 6 at time tld which is later by a delay time Dt than time t1 at which supply of the fuel gas is stopped. By delaying the valve opening time of the discharge valve 6 more than the valve opening time in the first control example, the recirculation flow duration time Tfe in control period #2 is longer than the recirculation flow duration time Tfd in the first control example. Accordingly, even when the amount of liquid water in the gas-liquid separator 5 is large, the gas discharge time of the off-gas can be secured to be longer than that in the first control example.

Here, the ECU 7 estimates an amount of liquid water in the fuel cell stack 1 from the temperature T of the coolant and delays the valve opening time of the discharge valve 6 by the delay time Dt corresponding to the amount of liquid water. Accordingly, the ECU 7 can set the delay time Dt with high accuracy based on the amount of liquid water flowing from the fuel cell stack 1 to the gas-liquid separator 5. When the delay time Dt is longer than the recirculation flow duration time Tf, the ECU 7 does not delay the valve opening time of the discharge valve 6 but sets the valve opening time to be almost the same as the time at which supply of the fuel gas is stopped such that the valve opening time of the discharge valve 6 is not a time after the recirculation flow stops.

Similarly to the first control example, the ECU 7 closes the discharge valve 6 before time t3d at which the recirculation flow stops. Accordingly, waste of the fuel gas after the recirculation flow has stopped is curbed.

Fifth Control Example

Figure 9:
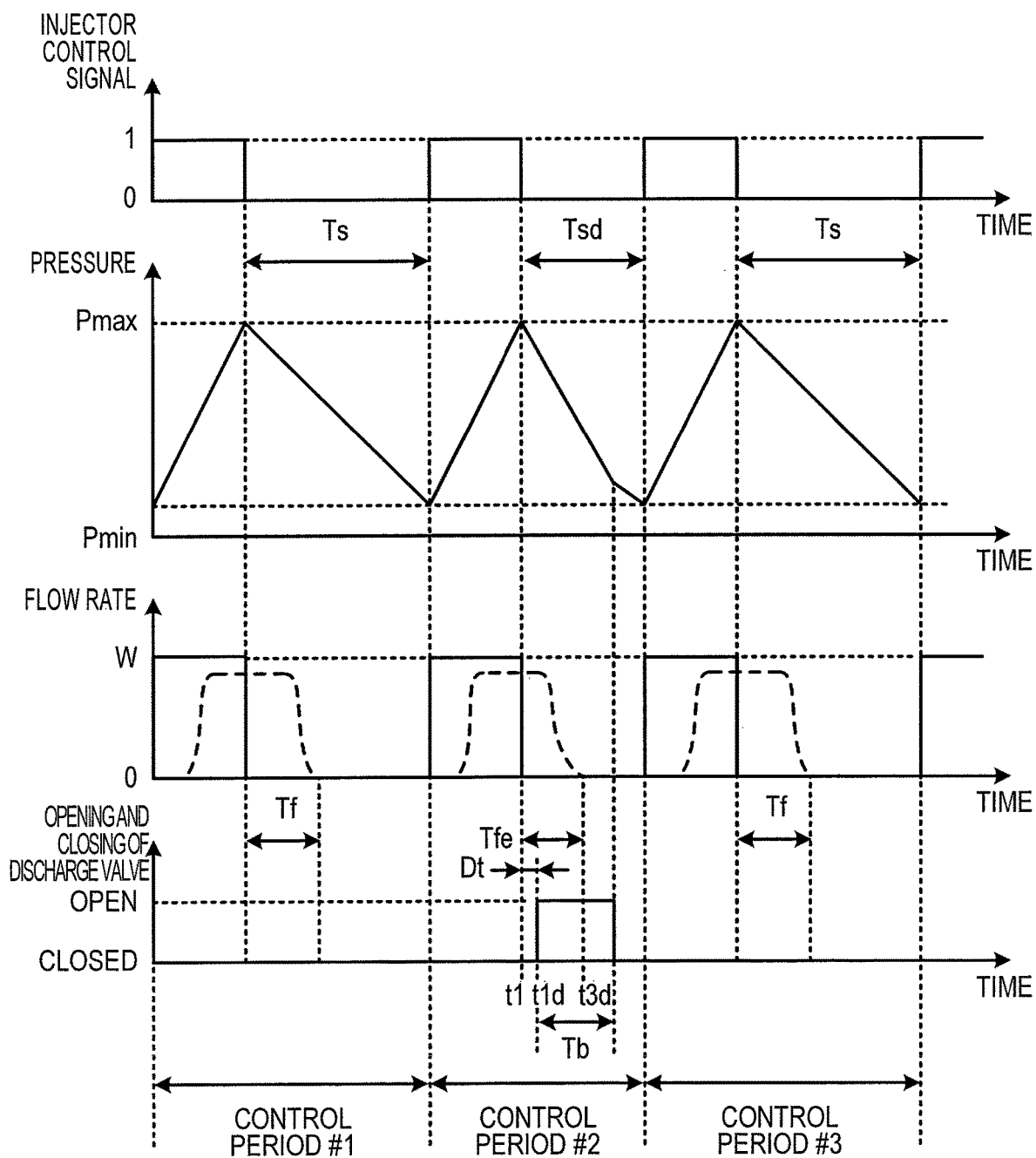
FIG. 9 is a timing chart illustrating a fifth control example.

FIG. 9 is a timing chart illustrating a fifth control example. Details in FIG. 9 which are common to FIG. 6 will not be described below. In this example, the valve opening time of the discharge valve 6 is delayed from the valve opening time in the second control example.

Similarly to the fourth control example, the ECU 7 delays the valve opening time of the discharge valve 6. Similarly to the second control example, the ECU 7 closes the discharge valve 6 after time t3d at which the recirculation flow stops. Accordingly, the gas discharge time which is longer than in the fourth control example can be secured.

Sixth Control Example

Figure 10:
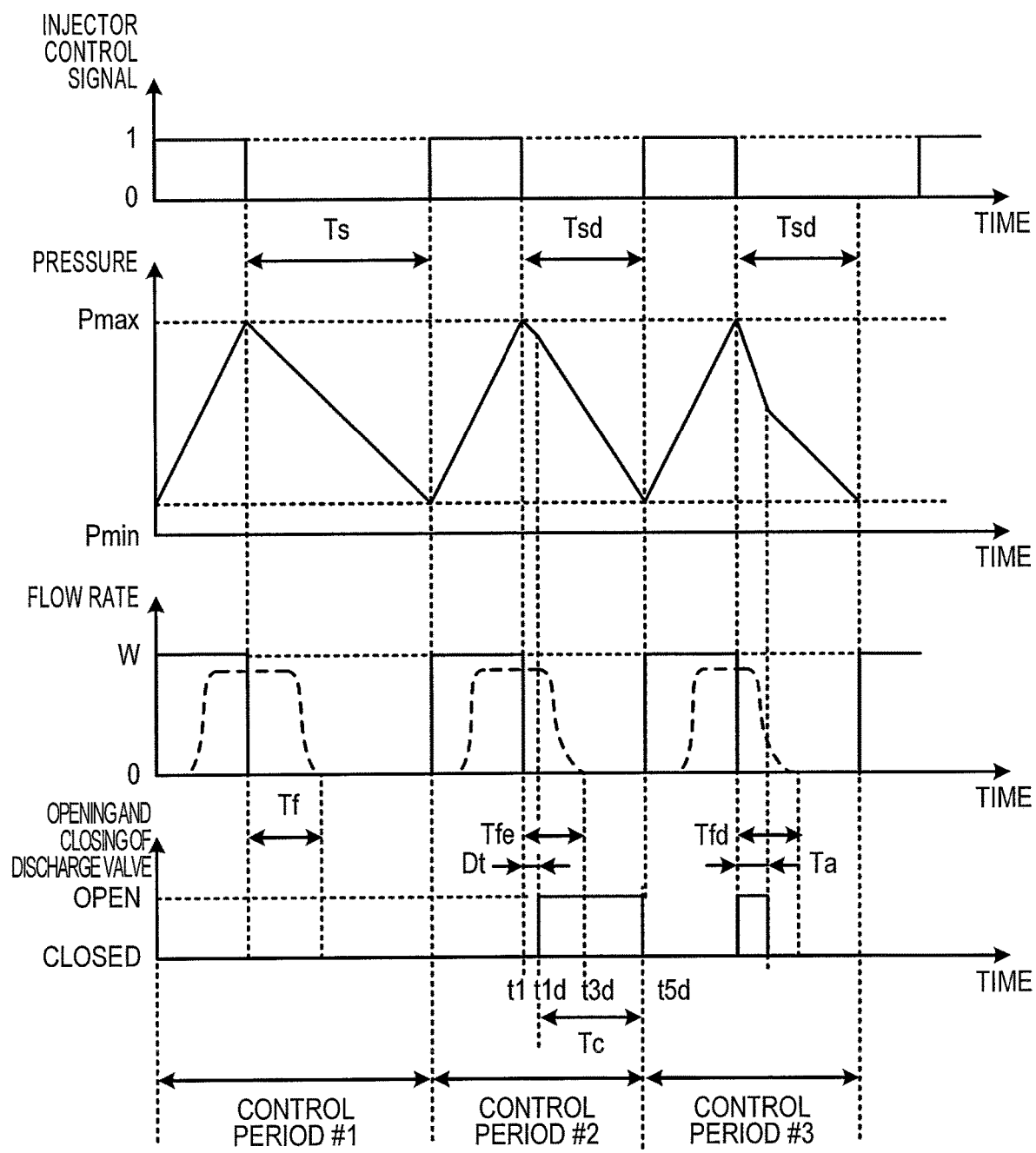
FIG. 10 is a timing chart illustrating a sixth control example.

FIG. 10 is a timing chart illustrating a sixth control example. Details in FIG. 10 which are common to FIG. 7 will not be described below. In this example, the valve opening time of the discharge valve 6 is delayed from the valve opening time in the third control example.

Similarly to the fourth control example, the ECU 7 delays the valve opening time of the discharge valve 6. Similarly to the third control example, the ECU 7 closes the discharge valve 6 after time t5d after time t3d at which the recirculation flow stops and immediately before supply of the fuel gas is restarted. Accordingly, the gas discharge time which is longer than in the fifth control example can be secured.

Process of Controlling Supply of Fuel Gas

Figure 11:
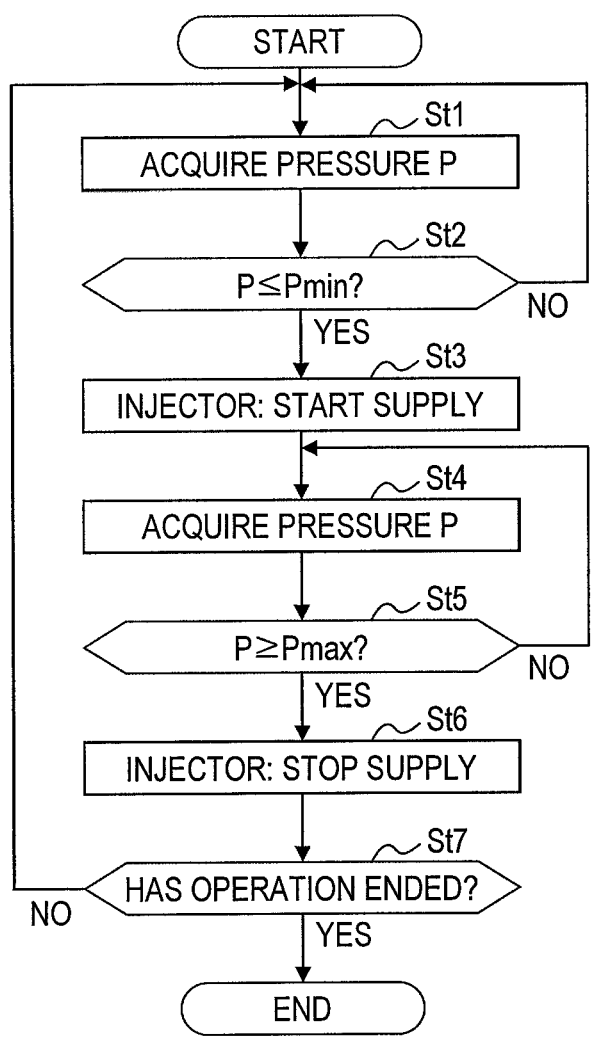
FIG. 11 is a flowchart illustrating an example of a process of controlling supply of a fuel gas.

FIG. 11 is a flowchart illustrating an example of a process of controlling supply of the fuel gas. The ECU 7 acquires a pressure P of a mixed gas of the fuel gas and the off-gas on the inlet side of the fuel cell stack 1 from the pressure sensor 90 (Step SU).

Then, the ECU 7 compares the pressure P with the lower limit value Pmin (Step St2). When the pressure P is greater than the lower limit value Pmin (NO in Step St2), the ECU 7 acquires the pressure P again (Step St1).

When the pressure P is equal to or less than the lower limit value Pmin (YES in Step St2), the ECU 7 causes the injector 3 to start supply of the fuel gas (Step St3). Then, the ECU 7 acquires the pressure P from the pressure sensor 90 (Step St4).

Then, the ECU 7 compares the pressure P with the upper limit value Pmax (Step St5). When the pressure P is less than the upper limit value Pmax (NO in Step St5), the ECU 7 acquires the pressure P again (Step St4).

When the pressure P is equal to or greater than the upper limit value Pmax (YES in Step St5), the ECU 7 causes the injector 3 to stop supply of the fuel gas (Step St6). Thereafter, when the operation of the fuel cell system ends (YES in Step St7), the process flow ends. When the operation is continuously performed (NO in Step St7), the processes of Step St1 and steps subsequent thereto are performed again. In this way, the process of controlling supply of the fuel gas is performed. The ECU 7 may store, for example, map data indicating the stoppable period Tsd of supply of the fuel gas with respect to the pressure P in a memory or the like and control a starting time and a stopping time of supply of the fuel gas depending on the stoppable period Tsd.

Process of Controlling Opening and Closing of Discharge Valve 6

Figure 12:
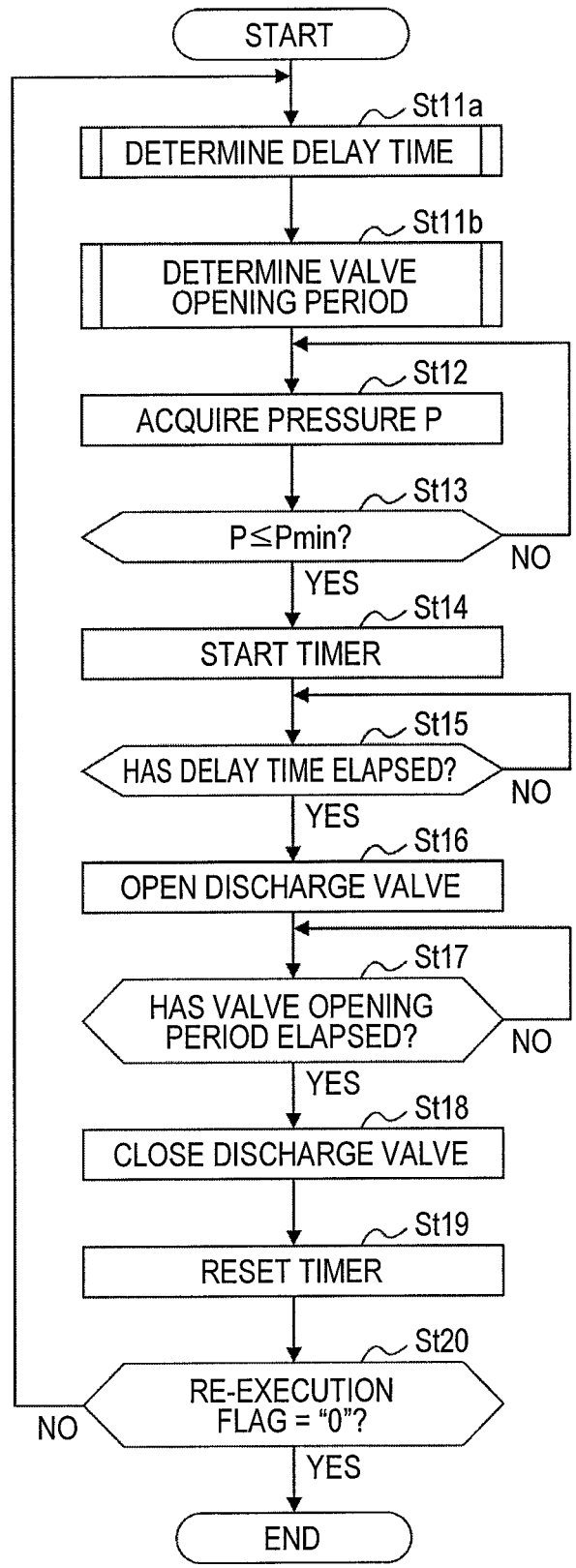
FIG. 12 is a flowchart illustrating an example of a process of controlling opening and closing of a discharge valve.

FIG. 12 is a flowchart illustrating an example of a process of controlling opening and closing of the discharge valve 6. The process of controlling opening and closing of the discharge valve 6 is performed, for example, when the concentration or the partial pressure of impurities in the off-gas is greater than a threshold value.

The ECU 7 determines the delay time Dt of the valve opening time of the discharge valve 6 (Step St11a). Then, the ECU 7 determines the valve opening periods Ta to Tc of the discharge valve 6 (Step St11b). The processes of determining the delay time Dt and the valve opening periods Ta to Tc will be described later.

Then, the ECU 7 acquires the pressure P from the pressure sensor 90 (Step St12) and compares the pressure P with the lower limit value Pmin (Step St13). When the pressure P is greater than the lower limit value Pmin (NO in Step St13), the ECU 7 acquires the pressure P again (Step St12).

When the pressure P is equal to or less than the lower limit value Pmin (YES in Step St13), the ECU 7 starts a timer for counting the time (Step St14). Then, the ECU 7 determines whether the time indicated by the timer is longer than the delay time Dt (Step St15). When the time is not longer than the delay time Dt (NO in Step St15), the process of Step St15 is performed again.

When the time is longer than the delay time Dt (YES in Step St15), the ECU 7 opens the discharge valve 6 (Step St16). Accordingly, the off-gas and the liquid water are discharged from the discharge valve 6 to the outside.

Then, the ECU 7 determines whether the time indicated by the timer is longer than the valve opening periods Ta to Tc (Step St17). When the time is not longer than the valve opening periods Ta to Tc (NO in Step St17), the process of Step St17 is performed again.

When the time is longer than the valve opening periods Ta to Tc (YES in Step St17), the ECU 7 closes the discharge valve 6 (Step St18). Accordingly, discharge of the off-gas and the liquid water is stopped.

Then, the ECU 7 resets the timer (Step St19). Then, the ECU 7 determines whether a re-execution flag is "0" (Step St20). The re-execution flag indicates whether the process of controlling opening and closing of the discharge valve 6 is to be performed again. The re-execution flag is set to "1" when the valve opening period Tc is determined in Step St11b, and is set to "0" when other valve opening periods Ta and Tb are determined.

When the re-execution flag is "1" (NO in Step St20), the ECU 7 performs the processes of Step St11a and steps subsequent thereto again. When the re-execution flag is "0" (YES in Step St20), the ECU 7 ends the process flow. In this way, the process of controlling opening and closing of the discharge valve 6 is performed.

Process of Determining Delay Time Dt

Figure 13:
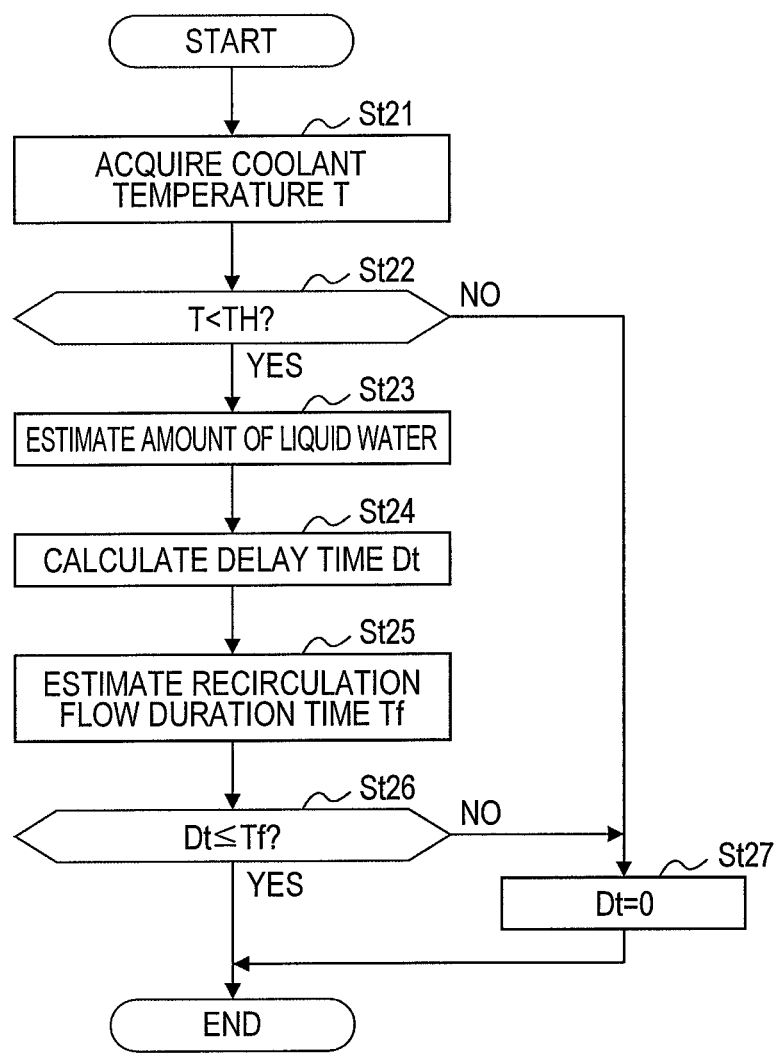
FIG. 13 is a flowchart illustrating an example of a process of determining a delay time.

FIG. 13 is a flowchart illustrating an example of the process of determining the delay time Dt. The process of determining the delay time Dt is performed in Step St11a.

The ECU 7 acquires the temperature T of the coolant from the temperature sensor 82 (Step St21). Then, the ECU 7 compares the temperature T with a threshold value TH (Step St22). Here, the threshold value TH may be a fixed value or may be a value which is dynamically set depending on the state of the fuel cell stack 1 by the ECU 7.

When the temperature T is equal to or higher than the threshold value TH (NO in Step St22), the ECU 7 determines that the temperature in the fuel cell stack 1 is high and the amount of liquid water is small, and determines the delay time Dt to be zero (Step St27). In this case, the valve opening time of the discharge valve 6 is not delayed from the time at which supply of the fuel gas is stopped.

When the temperature T is lower than the threshold value TH (YES in Step St22), the ECU 7 determines that the temperature in the fuel cell stack 1 is low and the amount of liquid water is large, and estimates the amount of liquid water in the fuel cell stack 1 from the temperature T (Step St23). Then, the ECU 7 calculates the delay time Dt from the estimated amount of liquid water (Step St24). In this case, the delay time Dt is longer than the delay time Dt (=0) when the temperature T is equal to or higher than the threshold value TH.

The delay time Dt becomes longer as the amount of liquid water becomes larger. That is, the ECU 7 further delays the time at which the discharge valve 6 is opened as the estimated amount of liquid water becomes larger. Accordingly, it is possible to secure an appropriate time for discharging the liquid water from the fuel cell stack 1. Since the ECU 7 estimates the delay time Dt from the temperature T, the ECU 7 can determine the delay time Dt with higher accuracy than that when the delay time Dt is a fixed value. The delay time Dt is not limited thereto and may be a fixed value.

Then, the ECU 7 estimates the recirculation flow duration time Tf from map data such as an amount of fuel gas injected from the injector 3, an amount of liquid water in the fuel cell stack 1, and design parameters of the ejector 2 and the recirculation line L4 (Step St25). Then, the ECU 7 compares the recirculation flow duration time Tf with the delay time Dt (Step St26).

When the delay time Dt is equal to or less than the recirculation flow duration time Tf (YES in Step St26), the ECU 7 ends the process flow. In this case, the ECU 7 determines the delay time Dt to be the value calculated in Step St24.

When the delay time Dt is greater than the recirculation flow duration time Tf, the ECU 7 determines the delay time Dt to be zero such that the valve opening time of the discharge valve 6 is not a time after the recirculation flow stops (Step St27). The process of determining the delay time Dt is performed in this way and the process flow ends.

Process of Determining Valve Opening Periods Ta to Tc of Discharge Valve 6

Figure 14:
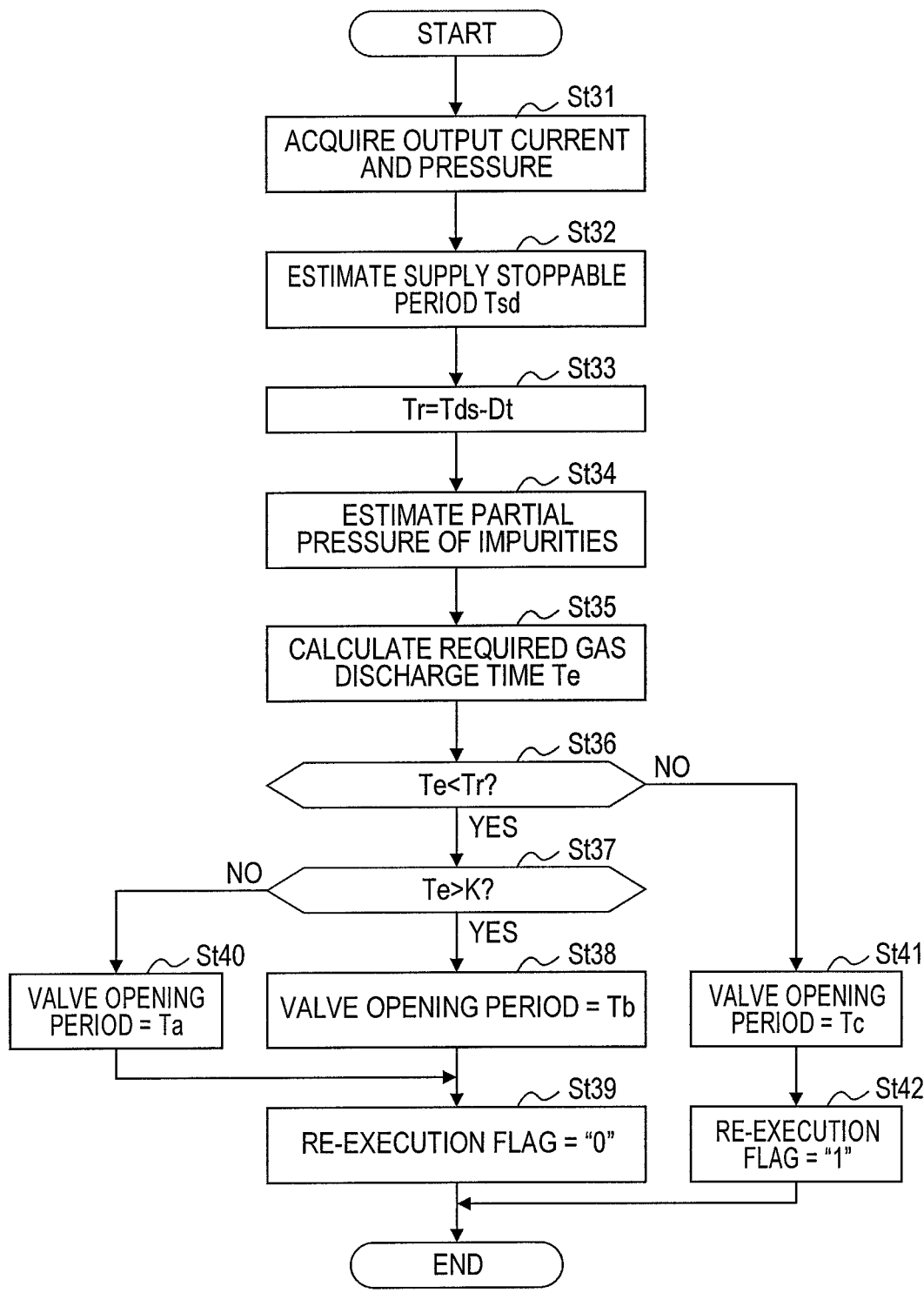
FIG. 14 is a flowchart illustrating an example of a process of determining a valve opening period of a discharge valve.

FIG. 14 is a flowchart illustrating an example of the process of determining the valve opening periods Ta to Tc of the discharge valve 6. The process of determining the valve opening periods Ta to Tc is performed in Step St11b.

The ECU 7 acquires the output current of the fuel cell stack 1 from the current sensor 91, and acquires the pressure P from the pressure sensor 90 (Step St31). Then, the ECU 7 estimates the stoppable period Tsd of supply of the fuel gas based on the output current and the pressure P, for example, with reference to map data (Step St32). Here, since an amount of fuel gas consumed in the fuel cell stack 1 is determined depending on the output current, a decrease in the pressure P can be calculated from the output current and the stoppable period Tsd can be predicted.

Then, the ECU 7 calculates a corrected supply stoppable period Tr by subtracting the delay time Dt from the stoppable period Tsd (Step St33). This is because when the valve opening time of the discharge valve 6 is delayed, the off-gas cannot be discharged by the delay time Dt in the stoppable period Tsd.

Then, the ECU 7 estimates the partial pressure of impurities in the off-gas (Step St34). Examples of impurities in the off-gas include nitrogen which is generated at a cathode of the fuel cell stack 1 and moisture which is generated by a chemical reaction, that is, steam. The partial pressure of nitrogen is calculated, for example, based on a stoichiometric ratio of the oxidant gas which is supplied to the cathode of the fuel cell stack 1, and the partial pressure of steam is calculated, for example, based on the temperature T of the coolant. The ECU 7 sums the partial pressure of nitrogen and the partial pressure of steam to estimate the partial pressure of impurities.

Then, the ECU 7 calculates the required gas discharge time Te based on the partial pressure of impurities (Step St35). At this time, the ECU 7 determines a necessary discharge gas volume (cc) from the partial pressure of impurities and determines a discharge gas flow rate (cc/sec) from the partial pressure of impurities and the pressure P.

The ECU 7 calculates the required gas discharge time Te by dividing the discharge gas volume by the discharge gas flow rate.

Then, the ECU 7 compares the corrected stoppable period Tr with the required gas discharge time Te (Step St36). When the required gas discharge time Te is equal to or greater than the stoppable period Tr (NO in Step St36), the ECU 7 sets the valve opening period Tc in which the valve closing time of the discharge valve 6 is immediately before supply of the fuel gas is restarted such that the discharge time of the off-gas in the stoppable period Tr is the longest (Step St41). Accordingly, discharge is performed during the corrected stoppable period Tr in the required gas discharge time Te.

Then, the ECU 7 sets the re-execution flag to "1" such that the off-gas is discharged in the remaining time of the required gas discharge time Te (Step St42). Thereafter, the process flow ends.

When the required gas discharge time Te is less than the stoppable period Tr (YES in Step St36), the ECU 7 compares the required gas discharge time Te with the predetermined value K (Step St37). When the required gas discharge time Te is greater than the predetermined value K (YES in Step St37), the ECU 7 sets the valve opening period Tb in which the valve closing time of the discharge valve 6 is after the recirculation flow stops such that the off-gas is continuously discharged after the recirculation flow stops (Step St38).

When the required gas discharge time Te is equal to or less than the predetermined value K (NO in Step St37), the ECU 7 sets the valve opening period Ta in which the valve closing time of the discharge valve 6 is before the recirculation flow stops such that discharge of the off-gas ends before the recirculation flow stops (Step St40). Thereafter, the ECU 7 sets the re-execution flag to "0" (Step St39) and ends the process flow. The process of determining the valve opening periods Ta to Tc is performed in this way.

In this way, since the ECU 7 determines the valve opening periods Ta to Tc of the discharge valve based on the required gas discharge time Te and the stoppable period Tsd, it is possible to open the discharge valve 6 in only the valve opening periods Ta to Tc which are suitable for the state of the fuel cell system 900 in consideration of the time at which supply of the fuel gas is restarted.

The above-mentioned embodiment is an exemplary embodiment of the disclosure. The disclosure is not limited thereto and can be modified in various forms without departing from the gist of the disclosure.

What is claimed is:

1. A fuel cell system comprising:
   a fuel cell configured to generate electric power by a reaction between a fuel gas and an oxidant gas;
   an injector configured to supply the fuel gas to the fuel cell;
   a discharge line in which an off-gas which is discharged from the fuel cell flows;
   an ejector configured to recirculate the off-gas flowing in the discharge line to the fuel cell using a flow of the fuel gas from the injector;
   a discharge valve configured to discharge the off-gas flowing in the discharge line to the outside;
   a first detection unit configured to detect a temperature of a cooling medium that cools the fuel cell; and
   a control device programmed to control the supply of the fuel gas by the injector and opening and closing of the discharge valve, wherein
   the control device is programmed to open the discharge valve while the off-gas is recirculated to the fuel cell and close the discharge valve before supply of the fuel gas by the injector is restarted, when supply of the fuel gas by the injector is stopped, and
   the control device is programmed to delay a time at which the discharge valve is opened further from a time at which supply of the fuel gas by the injector is stopped when the temperature of the cooling medium is lower than a threshold value than when the temperature of the cooling medium is equal to or higher than the threshold value.

2. The fuel cell system according to claim 1, wherein the control device is programmed to estimate an amount of liquid water in the fuel cell from the temperature of the cooling medium and further delay the time at which the discharge valve is opened as the amount of liquid water becomes greater.

3. The fuel cell system according to claim 1, wherein the control device is programmed to calculate a required time for discharging the off-gas based on a partial pressure of impurities in the off-gas and determine a valve opening period of the discharge valve based on the required time.

4. The fuel cell system according to claim 3, further comprising:
   a second detection unit configured to detect an output current of the fuel cell; and
   a third detection unit configured to detect a pressure of a mixed gas of the fuel gas supplied to the fuel cell and the off-gas recirculated to the fuel cell,
   wherein the control device is programmed to calculate a stoppable period of supply of the fuel gas based on the output current and the pressure of the mixed gas and determine the valve opening period of the discharge valve based on the required time and the stoppable period.

* * * * *